US010378452B1

(12) United States Patent
Barmichev et al.

(10) Patent No.: US 10,378,452 B1
(45) Date of Patent: Aug. 13, 2019

(54) HYBRID TURBINE JET ENGINES AND METHODS OF OPERATING THE SAME

(71) Applicant: The Boeing Company, Chicago, IL (US)

(72) Inventors: Sergey D. Barmichev, Kirkland, WA (US); Mark E. Howe, Mukilteo, WA (US); Stephen T. Brown, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 15/904,838

(22) Filed: Feb. 26, 2018

(51) Int. Cl.

| | |
|---|---|
| ***F02C 7/36*** | (2006.01) |
| ***F02C 6/14*** | (2006.01) |
| ***B64D 27/10*** | (2006.01) |
| ***B64D 27/24*** | (2006.01) |
| ***H02P 17/00*** | (2006.01) |
| ***B64D 35/08*** | (2006.01) |
| *F16D 23/02* | (2006.01) |
| *B64D 27/02* | (2006.01) |

(52) U.S. Cl.
CPC ................ *F02C 7/36* (2013.01); *B64D 27/10* (2013.01); *B64D 27/24* (2013.01); *B64D 35/08* (2013.01); *F02C 6/14* (2013.01); *H02P 17/00* (2013.01); *B64D 2027/026* (2013.01); *F05D 2220/323* (2013.01); *F05D 2220/76* (2013.01); *F16D 23/02* (2013.01)

(58) Field of Classification Search
CPC ........... F02C 7/36; B64D 27/10; B64D 27/24; B64D 35/08
See application file for complete search history.

(56) References Cited

U.S. PATENT DOCUMENTS 3,705,775 A * 12/1972 Rioux ........................ F01D 5/06 310/178
3,940,926 A * 3/1976 Craig ........................... 60/226.1
(Continued)

OTHER PUBLICATIONS

Farid Yousefi, Hybrid Turbo Fan Engine (Apr. 2012), Tech Briefs Create the Future Design Contest 2017, downloaded from TechBriefs.com on Dec. 13, 2017.
(Continued)

*Primary Examiner* — Sean Gugger
(74) *Attorney, Agent, or Firm* — Dascenzo Intellectual Property Law, P.C.

(57) ABSTRACT

Hybrid turbine engines and methods of operating the same are disclosed herein. The hybrid turbine engines include a first thrust-generating device that includes a turbine with a turbine rotary shaft and a clutch, which includes a clutch input, which is operatively coupled to the turbine rotary shaft, and a clutch output. The clutch defines an engaged state and a disengaged state. The hybrid turbine engines also include a rotary electric machine including a machine rotary shaft that is operatively coupled to the clutch output, a second thrust-generating device that is operatively coupled to the machine rotary shaft, and an electric power system. The rotary electric machine is configured to selectively receive an electric power output from the electric power system, such as to selectively produce additional thrust, and to selectively receive in an input torque from the machine rotary shaft, such as to selectively produce additional electric power.

21 Claims, 9 Drawing Sheets

(56) References Cited

U.S. PATENT DOCUMENTS

| | | | | |
|---|---|---|---|---|
| 4,424,452 | A * | 1/1984 | Francis | B60L 8/00 290/55 |
| 6,467,725 | B1 * | 10/2002 | Coles | F01D 15/10 244/58 |
| 8,099,944 | B2 | 1/2012 | Foster et al. | |
| 9,387,934 | B2 * | 7/2016 | Gomez | B64C 27/12 |
| 9,447,734 | B2 * | 9/2016 | Mariotto | F02C 7/36 |
| 2010/0013223 | A1 * | 1/2010 | Certain | B60K 6/24 290/31 |
| 2010/0083669 | A1 * | 4/2010 | Foster | F02C 6/18 60/802 |
| 2010/0270802 | A1 * | 10/2010 | Presz, Jr. | F03D 1/04 290/52 |
| 2010/0295317 | A1 * | 11/2010 | Mahawili | H02K 7/1869 290/55 |
| 2012/0068670 | A1 * | 3/2012 | Bersiek | F03D 1/025 322/30 |
| 2012/0128493 | A1 | 5/2012 | Shelley | |
| 2013/0000317 | A1 * | 1/2013 | Berryann | F01D 19/00 60/778 |
| 2014/0093399 | A1 * | 4/2014 | Pratelli | F04B 35/00 417/53 |
| 2015/0144742 | A1 * | 5/2015 | Moxon | B64D 27/12 244/215 |
| 2015/0377142 | A1 * | 12/2015 | Sheridan | F02C 3/107 60/778 |
| 2017/0275009 | A1 * | 9/2017 | Huang | B64D 27/10 |
| 2018/0003071 | A1 * | 1/2018 | Lents | F01D 15/10 |
| 2018/0079516 | A1 * | 3/2018 | Phan | B64C 39/024 |
| 2018/0163558 | A1 * | 6/2018 | Vondrell | F16D 48/06 |
| 2018/0354632 | A1 * | 12/2018 | Hon | B64D 27/24 |
| 2019/0002116 | A1 * | 1/2019 | Gansler | B64D 27/24 |

OTHER PUBLICATIONS

Hybrid Clutch Assembly for an Aircraft, Embry-Riddle Aeronautical University, Resolute Innovation, Oct. 1, 2014.

* cited by examiner

HYBRID TURBINE JET ENGINES AND METHODS OF OPERATING THE SAME

FIELD

The present disclosure relates generally to hybrid turbine jet engines and to methods of operating hybrid turbine jet engines.

BACKGROUND

Turbine jet engines may be utilized to power and/or to convey an aircraft, such as an airplane. Such turbine jet engines rely upon gas expansion, from combustion of a fuel, to provide a motive force for rotation of one or more compressors and/or turbines. As such, turbine jet engines may require a constant supply of fuel and may combust, or consume, the fuel continuously during operation thereof.

While turbine jet engines may be highly effective at generating thrust, there may be inefficiencies associated with operation thereof. As an example, the turbine jet engine must be sized for a maximum needed thrust, such as may be utilized during acceleration of an aircraft that utilizes the turbine jet engine, during take-off of the aircraft, and/or during an engine-out condition of the aircraft. As such, an operational efficiency of the turbine jet engine at constant, or cruise, speeds may be less than otherwise would be possible were the turbine jet engine sized for constant speeds. As another example, during deceleration of the aircraft, kinetic energy of the aircraft may be lost. As yet another example, during descent of the aircraft, potential energy of the aircraft may be lost. This lost kinetic and/or potential energy generally is not recovered and represents a loss of energy that initially was utilized to accelerate the aircraft and/or to attain a given altitude, respectively.

The above-discussed sizing constraints and/or energy losses represent inefficiencies in current turbine jet engine designs and are unaddressed by current hybrid engine designs. Thus, there exists a need for improved hybrid turbine jet engines and for methods of operating the improved hybrid turbine jet engines.

SUMMARY

Hybrid turbine engines and methods of operating the same are disclosed herein. The hybrid turbine engines include a first thrust-generating device that includes a turbine with a turbine rotary shaft. The hybrid turbine engines also include a clutch, which includes a clutch input that is operatively coupled to the turbine rotary shaft and a clutch output. The clutch defines an engaged state, in which the clutch input is rotationally coupled to the clutch output, and a disengaged state, in which the clutch input is rotationally decoupled from the clutch output. The hybrid turbine engines also include a rotary electric machine including a machine rotary shaft that is operatively coupled to the clutch output. The hybrid turbine engines further include a second thrust-generating device, which is operatively coupled to the machine rotary shaft, and an electric power system. The rotary electric machine is configured to selectively receive an electric power output from the electric power system and to generate an output torque to rotate the second thrust-generating device, via the machine rotary shaft, responsive to receipt of the electric power input. The rotary electric machine also is configured to selectively receive in an input torque from the machine rotary shaft, to generate an electric power output responsive to receipt of the input torque, and to provide the electric power output to the electric power system. The rotary electric machine may be configured to selectively receive the electric power output from the electric power system and to generate the output torque when the clutch is in the engaged state and/or in the disengaged state. As an example, when the clutch is in the engaged state, the rotary electric machine may be utilized to start the hybrid turbine engine.

The methods include combusting a fuel within a turbine of a first thrust-generating device to rotate a turbine rotary shaft of the first thrust-generating device. The methods also include selectively providing an electric power input to a rotary electric machine to generate an output torque that rotates a machine rotary shaft and a second thrust-generating device. The methods further include selectively receiving an input torque from the second thrust-generating device with the rotary electric machine and generating an electric power output with the rotary electric machine responsive to receipt of the input torque.

DESCRIPTION

Figure 1:
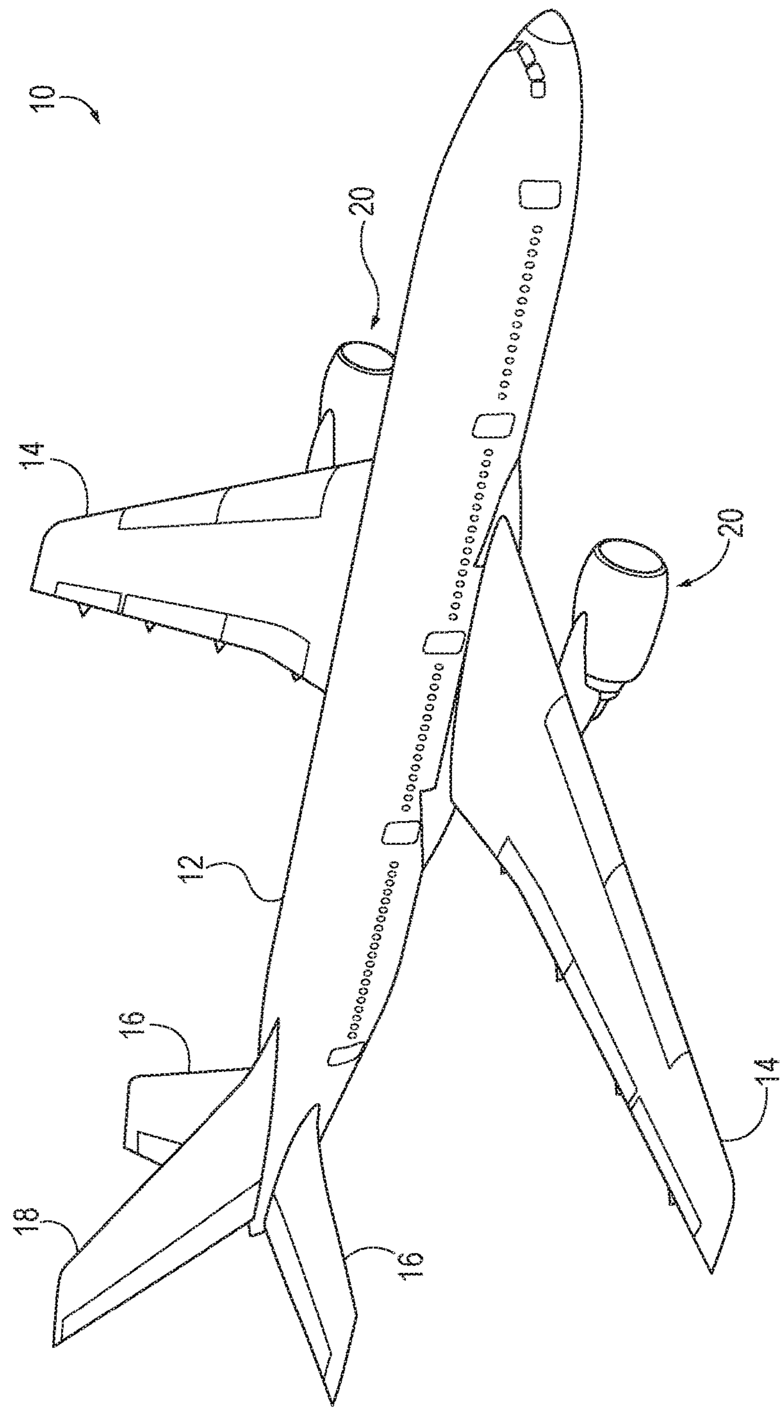
FIG. 1 is an illustration of an aircraft that may include and/or utilize hybrid turbine engines and/or methods, according to the present disclosure.

FIGS. 1-9 provide illustrative, non-exclusive examples of hybrid turbine engines 20, methods 200 of operating the hybrid turbine engines, and/or of aircraft 10 that may include and/or utilize hybrid turbine engines 20 and/or methods 200, according to the present disclosure. Elements that serve a similar, or at least substantially similar, purpose are labeled with like numbers in each of FIGS. 1-9, and these elements may not be discussed in detail herein with reference to each of FIGS. 1-9. Similarly, all elements may not be labeled in each of FIGS. 1-9, but reference numerals associated therewith may be utilized herein for consistency. Elements, components, and/or features that are discussed herein with reference to one or more of FIGS. 1-9 may be included in and/or utilized with any of FIGS. 1-9 without departing from the scope of the present disclosure.

In general, elements that are likely to be included in a given (i.e., a particular) embodiment are illustrated in solid lines, while elements that are optional to a given embodiment are illustrated in dashed lines. However, elements that are shown in solid lines are not essential to all embodiments, and an element shown in solid lines may be omitted from a given embodiment without departing from the scope of the present disclosure.

FIG. 1 is an illustration of an aircraft 10 that may include and/or utilize hybrid turbine engines 20 and/or methods 200, according to the present disclosure. Aircraft 10 may include a fuselage 12, one or more wings 14, a horizontal stabilizer 16, and/or a vertical stabilizer 18. Aircraft 10 also includes one or more hybrid turbine engines 20, examples of which are disclosed herein. Examples of aircraft 10 include an airplane, a commercial aircraft, and/or a military aircraft.

Figure 2:
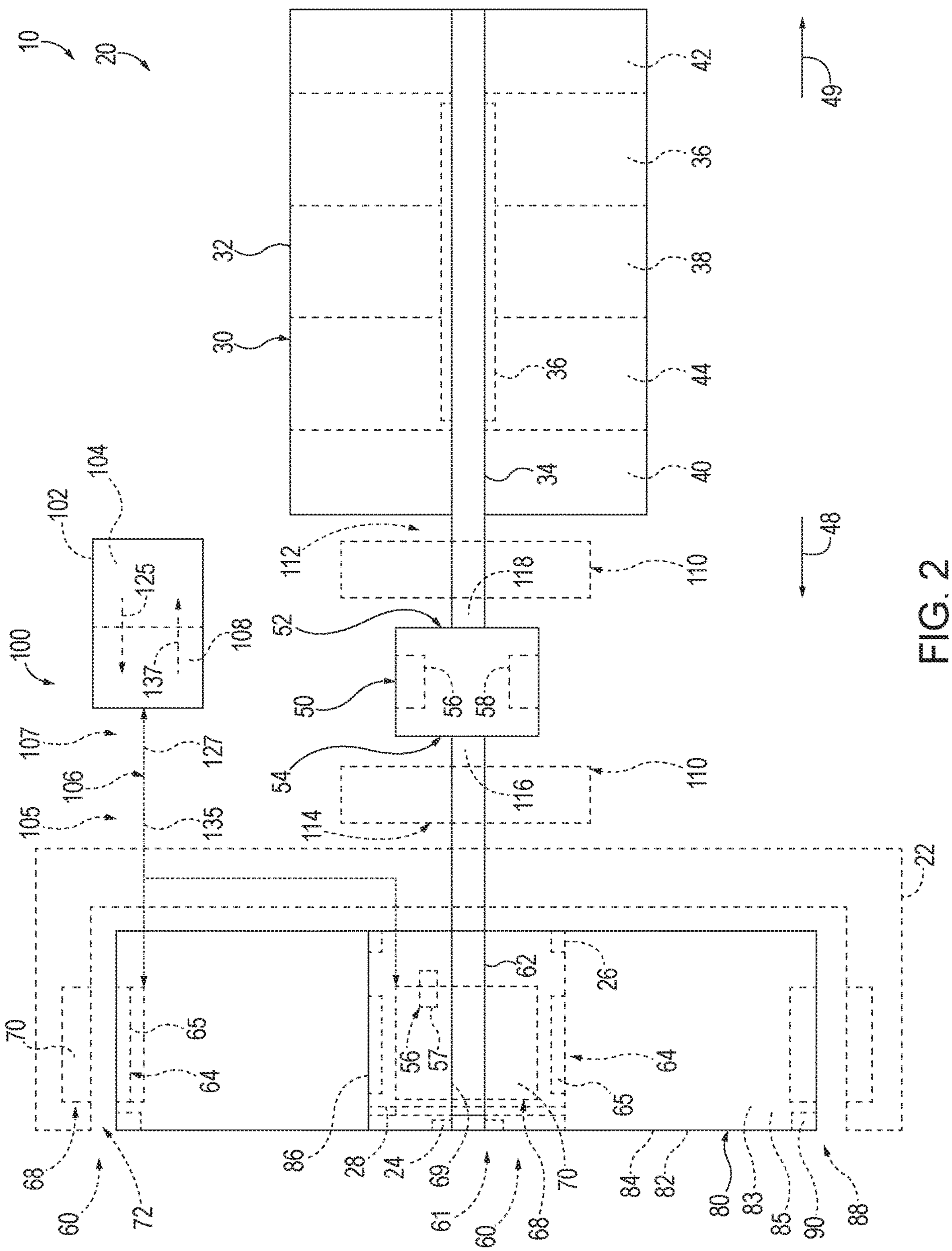
FIG. 2 is a schematic cross-sectional view illustrating examples of a hybrid turbine engine according to the present disclosure.
Figure 5:
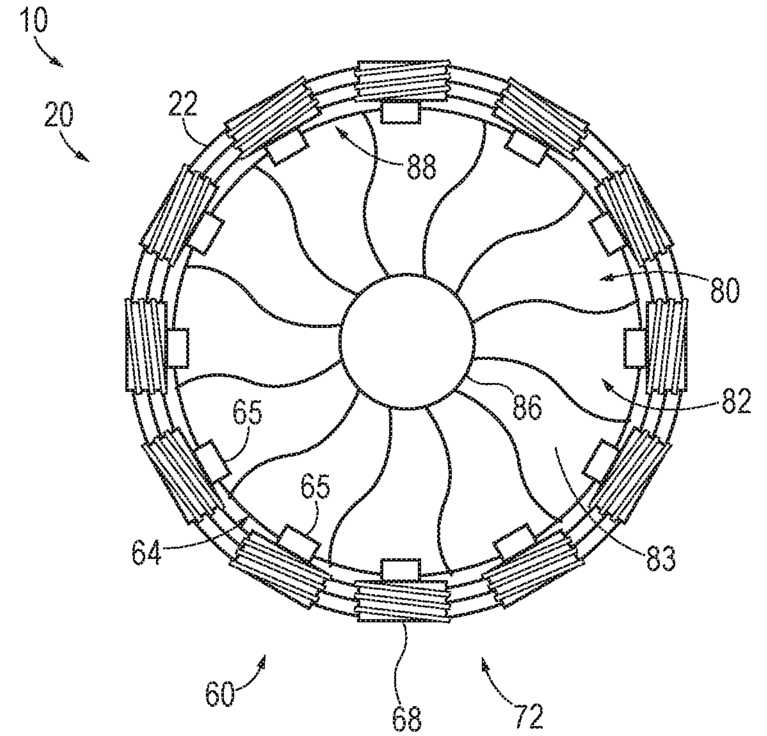
FIG. 5 is a front view of the hybrid turbine engine of FIG. 4.
Figure 6:
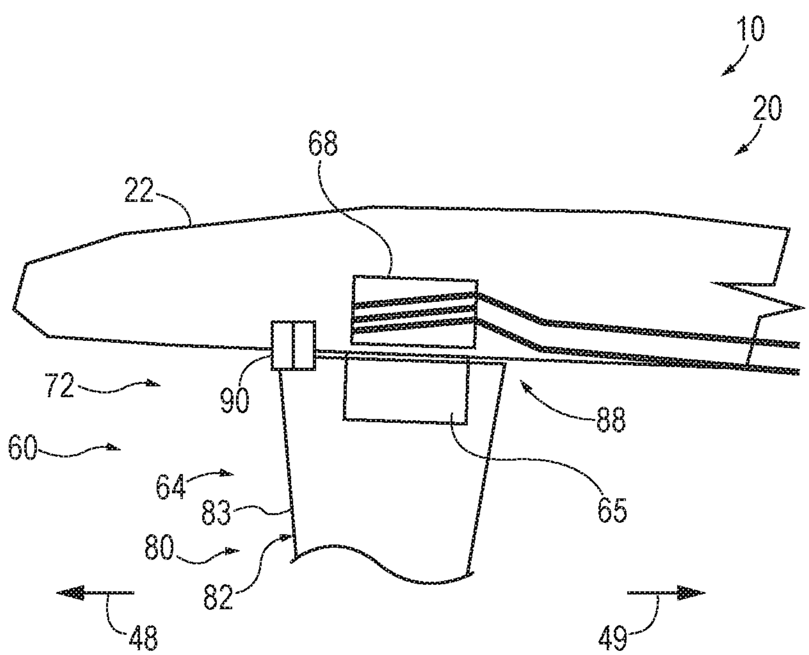
FIG. 6 is a cross-sectional view of a portion of the hybrid turbine engine of FIGS. 4-5 taken along line 6-6 of FIG. 4.

FIG. 2 is a schematic cross-sectional view illustrating examples of a hybrid turbine engine 20 according to the present disclosure. FIGS. 3-4 and 7-8 are less schematic cross-sectional views illustrating examples of hybrid turbine engines 20, according to the present disclosure. FIG. 5 is a front view of the hybrid turbine engine of FIG. 4, and FIG. 6 is a cross-sectional view of a portion of the hybrid turbine engine of FIGS. 4-5 taken along line 6-6 of FIG. 4.

As illustrated collectively by FIGS. 2-8, hybrid turbine engines 20 include a first thrust-generating device 30, which includes a turbine 32 that includes a turbine rotary shaft 34. Hybrid turbine engines 20 also include a clutch 50 including a clutch input 52, which is operatively coupled to turbine rotary shaft 34, and a clutch output 54. Clutch 50 defines a plurality of operational states including at least an engaged state, wherein the clutch input is rotationally coupled to the clutch output, and a disengaged state, wherein the clutch input is rotationally decoupled from the clutch output. Hybrid turbine engines 20 further include a rotary electric machine 60, which includes a machine rotary shaft 62 that is operatively coupled to clutch output 54. Hybrid turbine engines 20 also include a second thrust-generating device 80, which is operatively coupled to machine rotary shaft 62, and electric power system 100.

During operation of hybrid turbine engines 20, and as discussed in more detail herein, first thrust-generating device 30 and/or turbine 32 thereof may be utilized to provide a motive force for rotation of turbine rotary shaft 34. In addition, clutch 50 may be utilized to selectively and rotationally engage, or disengage, turbine rotary shaft 34 and machine rotary shaft 62, thereby selectively providing a motive force for rotation of machine rotary shaft 62.

In addition, rotary electric machine 60 may, or may be configured to, selectively receive an electric power input 105 from electric power system 100. Responsive to receipt of electric power input 105, rotary electric machine 60 may produce and/or generate an output torque that rotates second thrust-generating device 80 via machine rotary shaft 62. Stated another way, electric power system 100 may be utilized to power second thrust-generating device 80 via rotary electric machine 60. Stated yet another way, and responsive to receipt of electric power input 105, rotary electric machine 60 may be utilized to power second thrust-generating device 80. This powering of second thrust-generating device 80 may supplement first thrust-generating device 30, such as when clutch 50 is in the engaged state. Alternatively, this powering of second thrust-generating device 80 may be independent of first thrust-generating device 30, such as when clutch 50 is in the disengaged state.

Rotary electric machine 60 also may, or may be configured to, selectively receive an input torque from machine rotary shaft 62. Responsive to receipt of the input torque, rotary electric machine 60 may produce and/or generate an electric power output 107, which may be provided to electric power system 100. Stated another way, rotary electric machine 60 may be, or may function as, an electric power source, such as a generator and/or an alternator, that may be utilized to charge, or to recharge, electric power system 100. The generation of electric power output 107 may be powered by first thrust-generating device 30, such as when clutch 50 is in the engaged state and machine rotary shaft 62 receives the input torque from the first thrust-generating device. Additionally or alternatively, the generation of electric power output 107 may be independent of the operation of first thrust-generating device 30, such as when clutch 50 is in the disengaged state and machine rotary shaft 62 receives the input torque from second thrust-generating device 80.

First thrust-generating device 30 may include any suitable turbine 32, or even a turbine assembly, that includes turbine rotary shaft 34 and/or that is configured to generate a first thrust. As an example, and as illustrated in dashed lines in FIG. 2 and in solid lines in FIGS. 3-4 and 7-8, turbine rotary shaft 34 may be a low-speed turbine rotary shaft 34 that rotates at a low-speed shaft rotational frequency. Under these conditions, first thrust-generating device 30 also may include a high-speed turbine rotary shaft 36 that rotates at a high-speed shaft rotational frequency. The high-speed shaft rotational frequency may be greater than the low-speed shaft rotational frequency.

First thrust-generating device 30 also may include a combustion chamber 38, which may be configured to receive and to combust a fuel to power the first thrust-generating device. First thrust-generating device 30 further may include a compressor 40, which also may be referred to herein as a low-pressure compressor 40. Compressor 40 may be upstream, or positioned in an upstream direction 48, from combustion chamber 38, may be operatively coupled to turbine rotary shaft 34, and/or may be configured to rotate with the turbine rotary shaft.

First thrust-generating device 30 also may include a turbine 42, which also may be referred to herein as a low-pressure turbine 42. Turbine 42 may be downstream, or positioned in a downstream direction 49, from combustion chamber 38, may be operatively coupled to turbine rotary shaft 34, and/or may be configured to rotate with the turbine rotary shaft.

Figure 3:
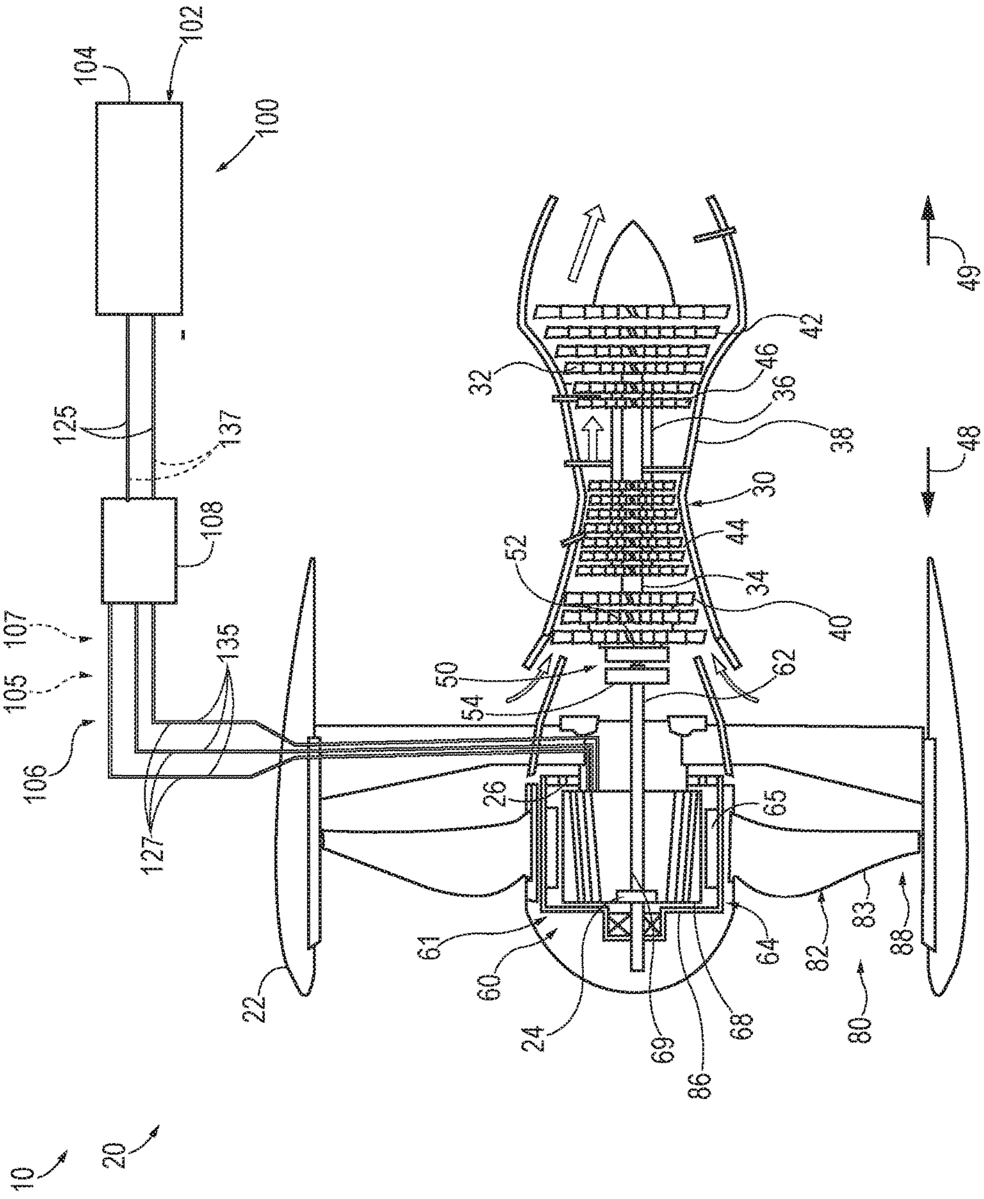
FIG. 3 is a less schematic cross-sectional view illustrating an example of a hybrid turbine engine according to the present disclosure.
Figure 4:
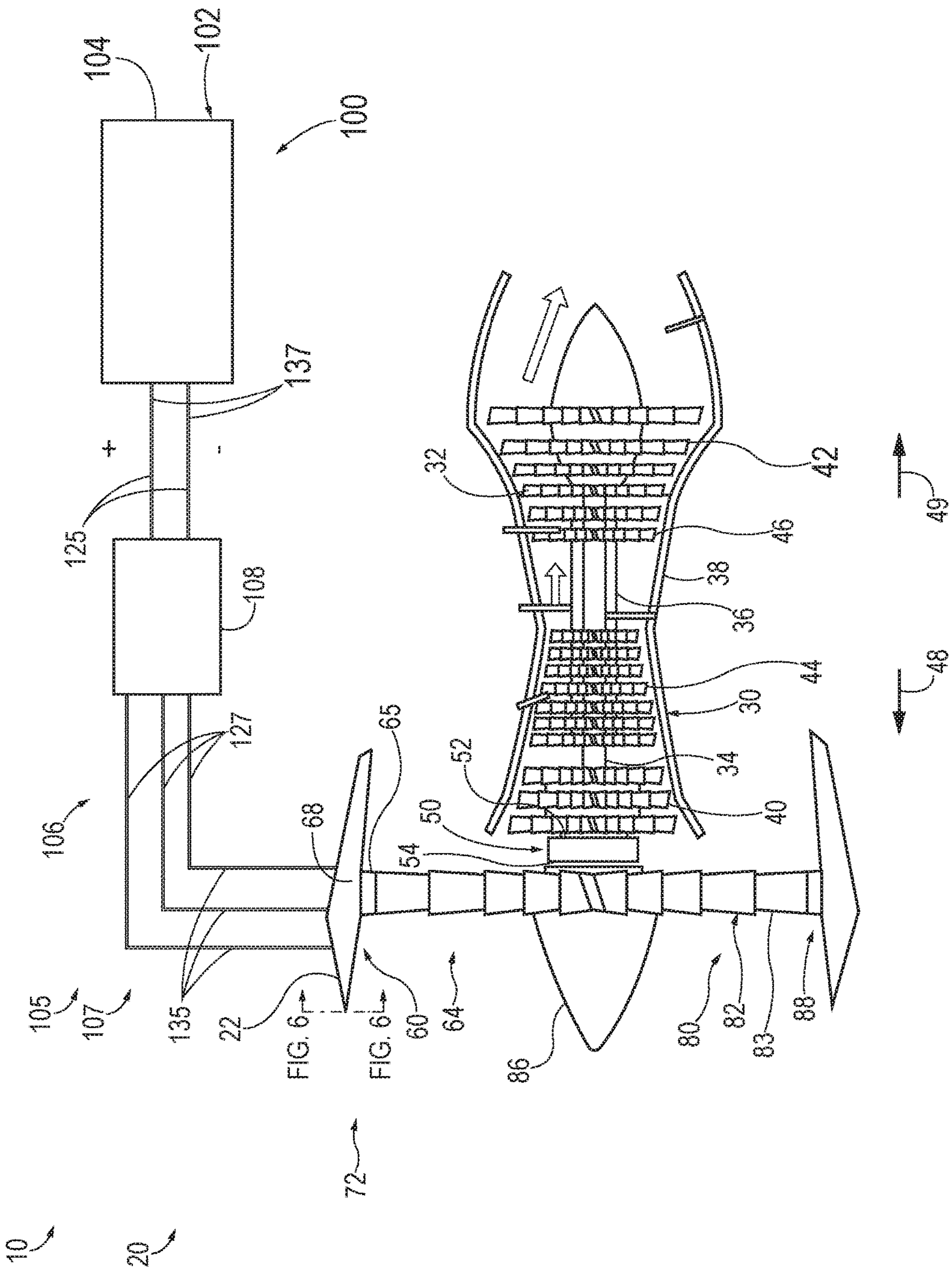
FIG. 4 is a less schematic cross-sectional view illustrating an example of a hybrid turbine engine according to the present disclosure.

As illustrated in FIGS. 2-4, first thrust-generating device 30 further may include a high-pressure compressor 44. High-pressure compressor 44, when present, may be downstream from low-pressure compressor 40, may be upstream from combustion chamber 38, may be operatively coupled to high-speed turbine rotary shaft 36, and/or may be configured to rotate with the high-speed turbine rotary shaft.

As also illustrated in FIGS. 2-4 and 7-8, first thrust-generating device 30 also may include a high-pressure turbine 46. High-pressure turbine 46, when present, may be downstream from combustion chamber 38, may be upstream from low-pressure turbine 42, may be operatively coupled to high-speed turbine rotary shaft 36, and/or may be configured to rotate with the high-speed turbine rotary shaft.

Figure 7:
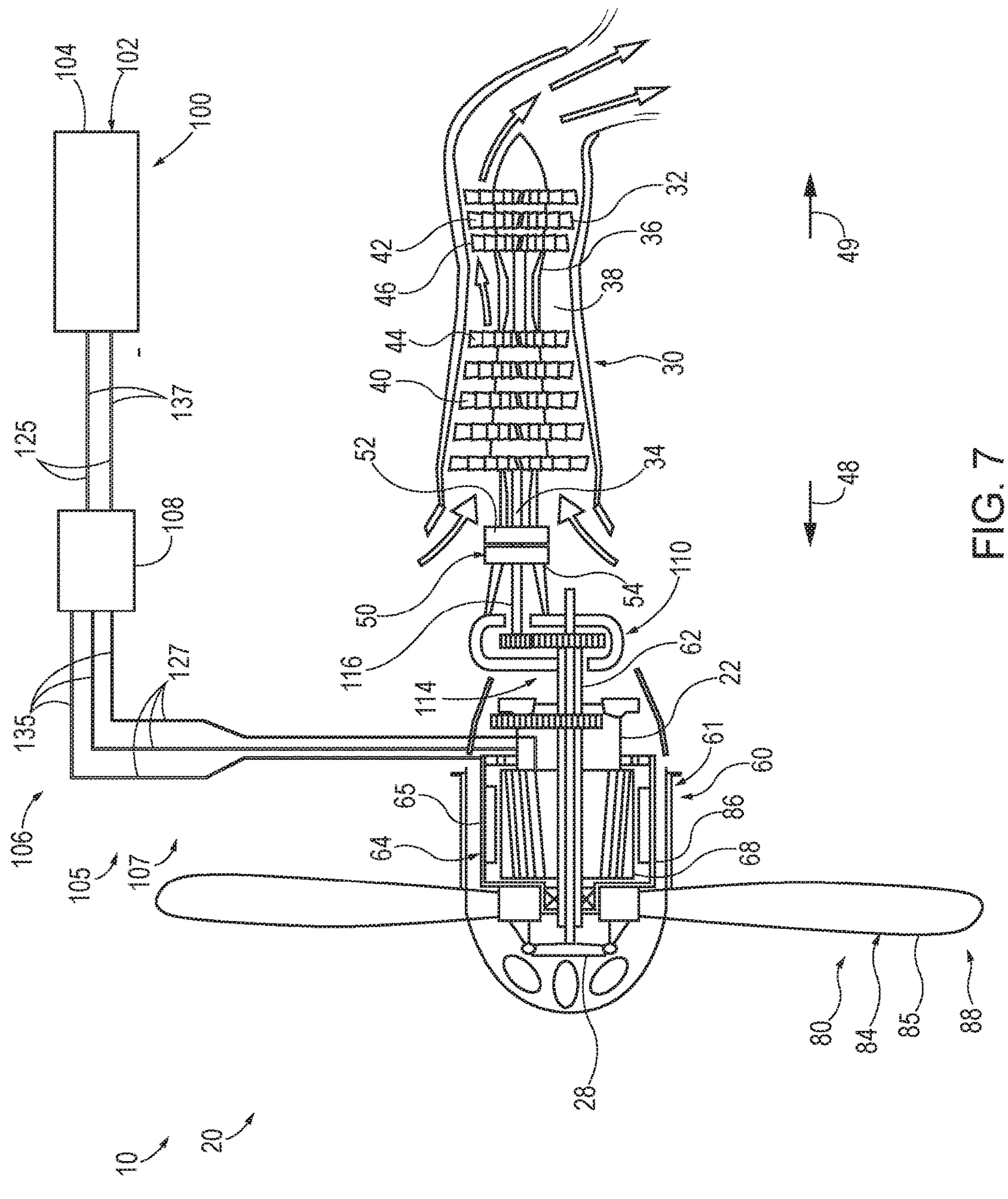
FIG. 7 is a less schematic cross-sectional view illustrating an example of a hybrid turbine engine according to the present disclosure.
Figure 8:
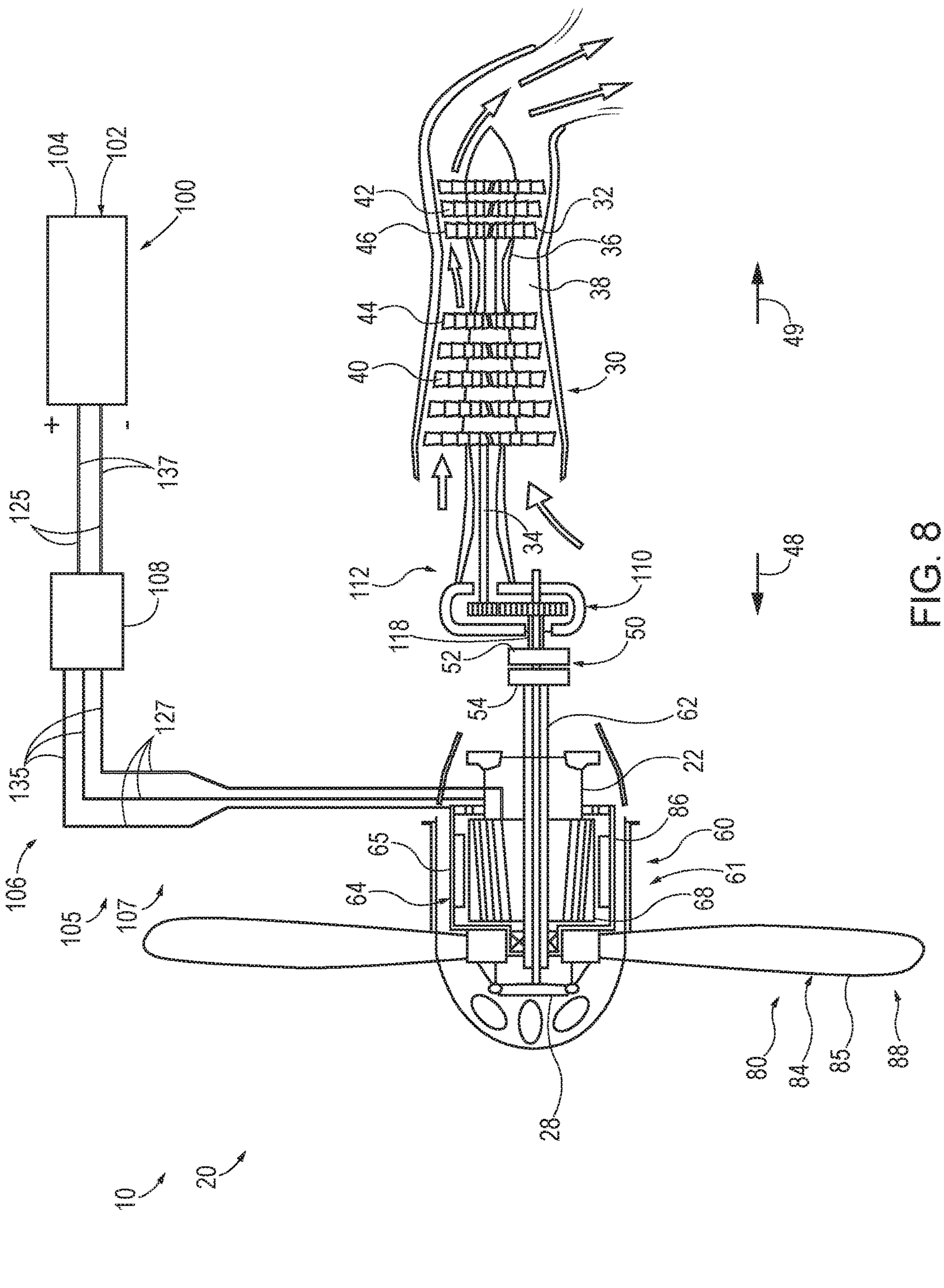
FIG. 8 is a less schematic cross-sectional view illustrating an example of a hybrid turbine engine according to the present disclosure.

Second thrust-generating device 80 may include any suitable structure that may be operatively coupled to machine rotary shaft 62 and/or that may be configured to generate a second thrust that is independent of the first thrust generated by first thrust-generating device 30. Examples of second thrust-generating device 80 include a fan 82, as illustrated in FIGS. 2-6, and/or a propeller 84, as illustrated in FIGS. 2 and 7-8. Fan 82, when present, may include a plurality of fan blades 83. Propeller 84, when present, may include a plurality of propeller blades 85. When second thrust-generating device 80 includes fan 82, hybrid turbine engine 20 also may be referred to herein as a turbofan hybrid turbine engine, as a hybrid turbofan engine, and/or as a turbofan engine. When second thrust-generating device 80 includes propeller 84, hybrid turbine engine 20 also may be referred to herein as a turboprop hybrid turbine engine, as a hybrid turboprop engine, and/or as a turboprop engine.

Clutch 50 may include any suitable structure that may be adapted, configured, designed, and/or constructed to include clutch input 52 and clutch output 54, as illustrated in FIG. 2, and/or to define at least the engaged state and the disengaged state. Examples of clutch 50 include an overrunning clutch, a one-way clutch, a one-way tapered clutch, a tooth clutch, and/or a synchronized clutch.

As illustrated in dashed lines in FIG. 2, hybrid turbine engine 20 and/or clutch 50 thereof may include a synchronization structure 56. Synchronization structure 56, when present, may be configured to synchronize clutch input 52 and clutch output 54, such as to permit clutch 50 to transition from the disengaged state to the engaged state and/or from the engaged state to the disengaged state while clutch input 52 and/or clutch output 54 rotates. An example of synchronization structure 56 includes a speed controller 57 configured to control a rotational frequency of rotary electric machine 60 to synchronize the clutch output to the clutch input. This may include synchronization of clutch output 54 to clutch input 52 to the same, or similar, respective rotational frequencies, such as to permit and/or facilitate low-friction engagement and/or disengagement of clutch 50 at any suitable synchronized rotational frequency.

It is within the scope of the present disclosure that clutch 50 may include and/or be an automatic, or an automatically actuated, clutch 50. Such an automatic clutch 50 may be configured to automatically rotationally couple clutch input 52 to clutch output 54 when a clutch input rotational frequency of the clutch input is greater than a clutch output rotational frequency of the clutch output. Such an automatic clutch 50 additionally or alternatively may be configured to automatically rotational decouple clutch input 52 from clutch output 54 when the clutch input rotational frequency is less than the clutch output rotational frequency.

It is also within the scope of the present disclosure that clutch 50 may include and/or be a selectively actuated clutch 50. Such a selectively actuated clutch 50 may be configured to be selectively actuated between the engaged state and the disengaged state, such as by an operator, or by a control system, of hybrid turbine engine 20. This may be accomplished in any suitable manner. As an example, and with continued reference to FIG. 2, clutch 50 may include an engagement structure 58 configured to selectively transition the clutch between the engaged state and the disengaged state. Examples of engagement structure 58 include an actuator, a lever, an electrically actuated engagement structure, a mechanically actuated engagement structure, and/or a hydraulically actuated engagement structure.

Rotary electric machine 60 may include any suitable structure that may include machine rotary shaft 62, that may be configured to receive electric power input 105 and to generate the output torque therefrom, and/or that may be configured to receive the input torque and to generate electric power output 107 therefrom. As examples, rotary electric machine 60 may include and/or be a generator, an alternator, an electric motor, and/or a permanent magnet brushless alternating current (AC) asynchronous axial electric machine.

As an additional example, rotary electric machine 60 may include a rotor 64, as illustrated in FIGS. 2-8. Rotor 64, when present, may be operatively attached to and/or may rotate with machine rotary shaft 62 and/or second thrust-generating device 80. As another example, rotary electric machine 60 may include a stator 68. Stator 68, when present, may be operatively attached to an engine case structure 22 of hybrid turbine engine 20.

It is within the scope of the present disclosure that machine rotary shaft 62 may be aligned, or axially aligned with turbine rotary shaft 34, as illustrated in FIGS. 2-4. Alternatively, it is also within the scope of the present disclosure that machine rotary shaft 62 may be offset, or axially offset, from turbine rotary shaft 34, as illustrated in FIGS. 7-8. Machine rotary shaft 62 may be parallel, or at least substantially parallel, to turbine rotary shaft 34.

As illustrated in dashed lines in FIG. 2 and in solid lines in FIGS. 3-4 and 7-8, second thrust-generating device 80 may include a central hub 86. As illustrated in FIGS. 2-3 and 7-8, at least a portion of rotary electric machine 60 may be internal to, located within, operatively attached to, and/or defined by the central hub. Such a rotary electric machine may be referred to herein as a hub-drive rotary electric machine 61.

As an example, stator 68 of rotary electric machine 60 may be internal to central hub 86. As a more specific example, stator 68 may include a field coil 70 that may be operatively attached to engine case structure 22 and that also may be internal to central hub 86. As illustrated, stator 68 may define a central opening 69, and machine rotary shaft 62 may extend within and/or through the central opening.

Such a configuration may permit and/or facilitate inclusion of a forward bearing 24 in hybrid turbine engine 20. Forward bearing 24 may be forward of, or in upstream direction 48 from, at least a portion of rotary electric machine 60 and/or second thrust-generating device 80 and may be configured to support, or may support, machine rotary shaft 62 and/or central hub 86 on a front, forward, or upstream side of stator 68. Hybrid turbine engine 20 further may include an aft bearing 26, which also may support central hub 86, such as on an aft side of the central hub.

As discussed, rotary electric machine 60 may include rotor 64, and rotor 64 may be configured to rotate relative to stator 68. As illustrated in dashed lines in FIG. 2 and in solid lines in FIGS. 3 and 7-8, rotor 64 may include a plurality of magnets 65, which may be operatively attached to central hub 86. Magnets 65, when present, may be positioned between stator 68 and central hub 86, as illustrated. Stated another way, magnets 65 may be internal to, or located within, central hub 86.

Turning to the schematic illustration of FIG. 2 and the more specific illustrations of FIGS. 3-6, when second thrust-generating device 80 includes fan 82, fan 82 may include fan blades 83 that may be operatively attached to and/or may extend from central hub 86. Magnets 65, when present, may be operatively attached to and/or may extend from the periphery of fan blades 83 and in positional alignment with stator 68, as illustrated in FIGS. 4-6. Stated another way, magnets 65 may be internal to, or located within, fan blade 83 at the peripheral extremity of the fan blade that is opposite central hub 86. Additionally or alternatively, and as illustrated schematically in FIG. 2 and less schematically in FIGS. 7-8, when second thrust-generating device 80 includes prop, or propeller, 84, propeller 84 may include propeller blades 85 that may be operatively attached to and/or may extend from central hub 86.

Hybrid turbine engines 20 also may include a pitch control device 28. Pitch control device 28, when present, may be configured to adjust a pitch of fan blades 83 and/or of propeller blades 85. As an example, pitch control device 28 may be configured to rotate fan blades 83 and/or propeller blades 85 relative to central hub 86 and/or about an elongate axis thereof. At least a portion of pitch control device 28 may be operatively attached to and/or configured to rotate with central hub 86.

Turning now to the schematic illustration of FIG. 2 and the less schematic illustrations of FIGS. 4-6, an alternative example of rotary electric machine 60, in the form of a ring drive rotary electric machine 72, is illustrated. In this example of rotary electric machine 60, engine case structure 22 may surround at least a portion of second thrust-generating device 80, such as an outer periphery region 88 of the second thrust-generating device. Under these conditions, at least a portion of rotary electric machine 60 may be operatively attached to outer periphery region 88 and/or to the portion of case structure 22 that surrounds outer periphery region 88.

As an example, stator 68 of rotary electric machine 60 may be operatively attached to engine case structure 22, or to the portion of engine case structure 22 that surrounds outer periphery region 88. As a more specific example, field coil 70 of stator 68 may be operatively attached to the portion of engine case structure 22 that surrounds outer periphery region 88. As another example, rotor 64 of rotary electric machine 60 may be operatively attached to outer periphery region 88. As a more specific example, and when second thrust-generating device 80 includes fan 82, rotor 64 may be operatively attached to outer periphery region 88 of fan blades 83.

In ring drive rotary electric machines 72, the presence of rotor 64 on outer periphery region 88 of second thrust-generating device 80 may introduce additional forces on the second thrust-generating device when compared to thrust-generating devices that are not attached to and/or to not form a portion of a ring drive rotary electric machine. With this in mind, second thrust-generating device 80 and/or ring drive rotary electric machine 72 further may include a stabilization ring 90, as perhaps best illustrated in FIGS. 2 and 6. Stabilization ring 90, when present, may be operatively interconnect fan blades 83, a tip region of fan blades 83, and/or outer periphery region 88 of fan blades 83, such as to stabilize fan blades 83 relative to one another and/or to resist the additional forces generated by the presence of ring drive rotary electric machine 72.

As illustrated in solid lines in FIGS. 2-4, clutch input 52 may be directly, or directly and operatively, coupled to turbine rotary shaft 34. As also illustrated in solid lines in FIGS. 1-4, clutch output 54 may be directly, or directly and operatively, coupled to machine rotary shaft 62.

However, such a configuration is not required, and it is within the scope of the present disclosure that one or more structures may extend between, or operatively couple, clutch input 52 to turbine rotary shaft 34. Additionally or alternatively, one or more structures may extend between, or operatively couple, clutch output 54 to machine rotary shaft 62.

As an example, and as illustrated in dashed lines in FIG. 2 and in solid lines in FIGS. 7-8, hybrid turbine engine 20 may include a gear box 110. Gear box 110, when present, may be positioned between first thrust-generating device 30 and second thrust-generating device 80 and/or between turbine rotary shaft 34 and machine rotary shaft 62. In such a configuration, gear box 110 may be configured to provide a predetermined rotational frequency ratio between the turbine rotary shaft and the machine rotary shaft when clutch 50 is in the engaged state. As an example, and when hybrid turbine engine 20 includes second thrust-generating device 80 in the form of propeller 84 (i.e., when the hybrid turbine engine is the turboprop hybrid turbine engine), it may be desirable to decrease a rotational frequency of machine rotary shaft 62 when compared to turbine rotary shaft 34.

It is within the scope of the present disclosure that gear box 110 may be positioned between, or may operatively couple, turbine rotary shaft 34 and clutch 50. Stated another way, clutch input 52 may be operatively coupled to turbine rotary shaft 34 via gear box 110. Such a configuration is illustrated schematically in FIG. 1 and less schematically in FIG. 8. Under these conditions, gear box 110 may include a gear box input 112, which may be operatively coupled, or directly operatively coupled, to turbine rotary shaft 34. In addition, gear box 110 may include an output stub shaft 118, which may be operatively coupled, or directly operatively coupled, to clutch input 52.

Additionally or alternatively, it is also within the scope of the present disclosure that gear box 110 may be positioned between, or may operatively couple, clutch 50 and machine rotary shaft 62. Stated another way, clutch output 54 may be operatively coupled to machine rotary shaft 62 via gear box 110. Such a configuration is illustrated schematically in FIG. 2 and less schematically in FIG. 7. Under these conditions, gear box 110 may include an input stub shaft 116, which may be operatively coupled, or directly operatively coupled, to clutch output 54. In addition, gear box 110 may include a gear box output 114, which may be operatively coupled, or directly operatively coupled, to machine rotary shaft 62.

As discussed, hybrid turbine engine 20 includes electric power system 100. Electric power system 100 may include any suitable structure that may be configured to provide electric power input 105 to rotary electric machine 60 and also to receive electric power output 107 from the rotary electric machine. As an example, electric power system 100 may include an energy storage device 102 that may be configured to provide electric power input 105 to rotary electric machine 60 and also to receive electric power output 107 from the rotary electric machine. Energy storage device 102 may include any suitable structure that may be configured to selectively store and/or provide electric current. An example of energy storage device 102 includes a battery 104.

As illustrated in dashed lines in FIG. 2 and in solid lines in FIGS. 3-4 and 7-8, electric power system 100 also may include a power supply conduit 106. Power supply conduit 106 may extend between energy storage device 102 and rotary electric machine 60, may be configured to convey electric power input 105 from energy storage device 102 and/or to rotary electric machine 60, or to stator 68, and/or may be configured to convey electric power output 107 from rotary electric machine 60, or from stator 68, and/or to energy storage device 102. Examples of power supply conduit 106 include at least one electrical conductor, at least one wire, at least one insulated wire, and/or at least one electrical wire.

As also illustrated in dashed lines in FIG. 2 and in solid lines in FIGS. 3-4 and 7-8, electric power system 100 further may include a power conditioner 108, which also may be referred to herein as an electric power converter 108. Power conditioner 108, when present, may be configured to receive an unconditioned electric power input 125 from energy storage device 102, to condition the unconditioned electric power input to produce and/or generate a conditioned electric power input 135, and/or to provide the conditioned electric power input to rotary electric machine 60. Additionally or alternatively, power conditioner 108 may be configured to receive an unconditioned electric power output 127 from rotary electric machine 60, to condition the unconditioned electric power output to produce and/or generate a conditioned electric power output 137, and/or to provide the conditioned electric power output to energy storage device 102. An example of unconditioned electric power input 125 includes a direct current (DC) unconditioned electric power input. Examples of conditioned electric power input 135 include an alternating current (AC) conditioned electric power input, a single phase AC conditioned electric power input, and/or a three phase AC conditioned electric power input. Examples of unconditioned electric power output 127 include an alternating current (AC) unconditioned electric power output, a single phase AC unconditioned electric power output, and/or a three phase AC unconditioned electric power output. An example of conditioned electric power output 137 includes a DC conditioned electric power output.

Figure 9:
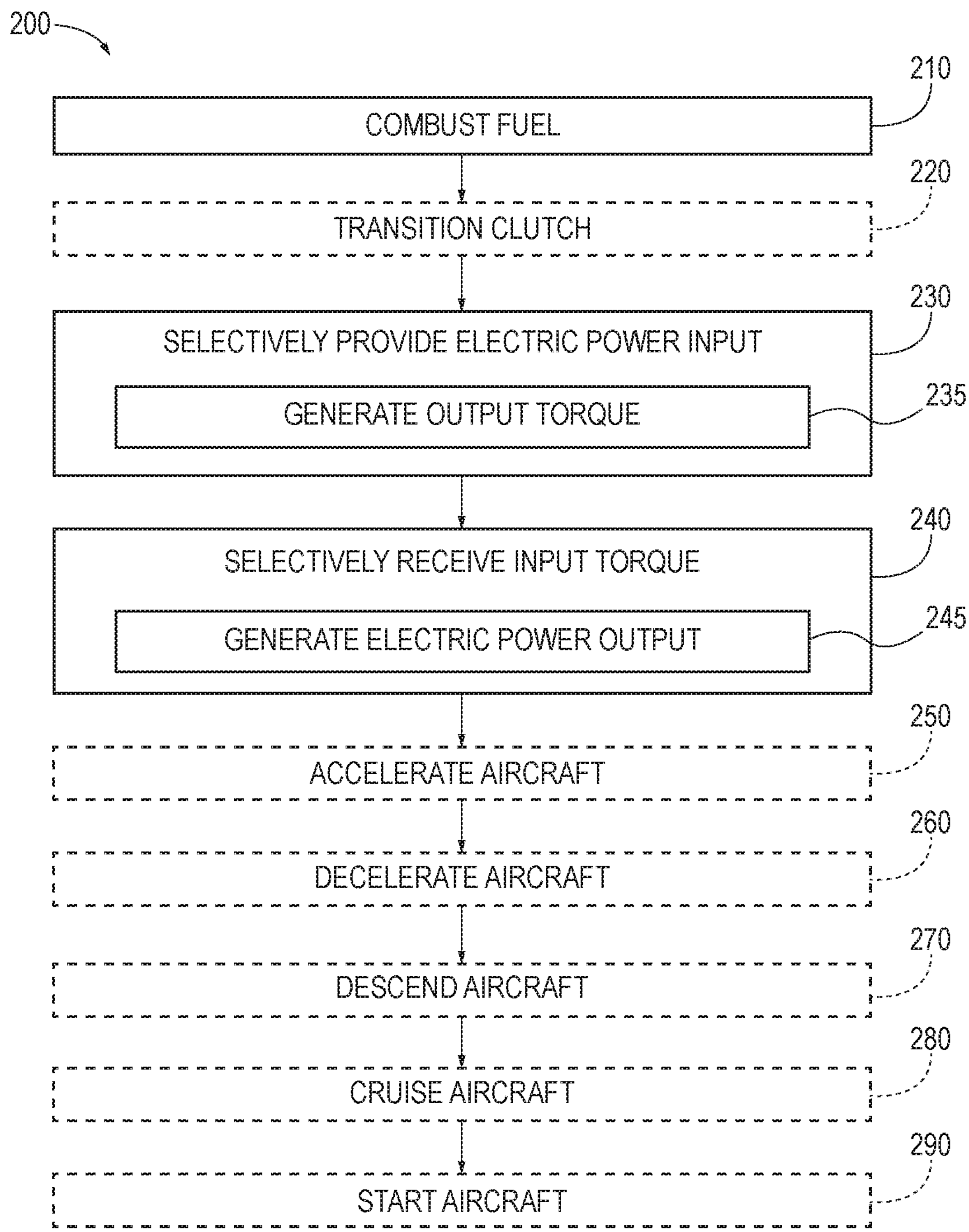
FIG. 9 is a flowchart depicting methods, according to the present disclosure, of operating a hybrid turbine engine.

FIG. 9 is a flowchart depicting methods 200, according to the present disclosure, of operating a hybrid turbine engine, such as hybrid turbine engine 20 of FIGS. 1-8 and/or aircraft 10 that includes hybrid turbine engine 20. Methods 200 include combusting a fuel at 210 and may include transitioning a clutch at 220. Methods 200 also include selectively providing an electric power input at 230 and selectively receiving an input torque at 240. Methods 200 further may include accelerating an aircraft at 250, decelerating the aircraft at 260, descending the aircraft at 270, cruising the aircraft at 280, and/or starting the aircraft at 290.

Combusting the fuel at 210 may include combusting the fuel within a turbine of a first thrust-generating device. This may include combusting to rotate a turbine rotary shaft of the first thrust-generating device at a turbine rotary shaft rotational frequency. The turbine rotary shaft is operatively coupled to a clutch input of a clutch. The clutch also includes a clutch output, which is operatively coupled to a machine rotary shaft of a rotary electric machine. The machine rotary shaft rotates at a machine rotary shaft rotational frequency, and a second thrust-generating device is operatively coupled to the machine rotary shaft.

Examples of the first thrust-generating device are disclosed herein with reference to first thrust-generating device 30 of FIGS. 2-4 and 7-8. Examples of the turbine rotary shaft are disclosed herein with reference to turbine rotary shaft 34 of FIGS. 2-4 and 7-8. Examples of the clutch are disclosed herein with reference to clutch 50 of FIGS. 2-4 and 7-8. Examples of the rotary electric machine are disclosed herein with reference to rotary electric machine 60 of FIGS. 2-4 and 7-8. Examples of the second thrust-generating device are disclosed herein with reference to second thrust-generating device 80 of FIGS. 2-4 and 7-8.

Transitioning the clutch at 220 may include transitioning the clutch between an engaged state, in which the clutch input is rotationally coupled to the clutch output, and a disengaged state, in which the clutch input is rotationally decoupled from the clutch output. The transitioning at 220 may include transitioning in any suitable manner and/or based upon any suitable criteria. As an example, the transitioning at 220 may include transitioning based upon an operational state of an aircraft that includes the hybrid turbine engine.

As another example, the transitioning at 220 may include transitioning to the engaged state when the turbine shaft rotational frequency is at least as great as the machine rotary shaft frequency. Such a configuration may permit and/or to facilitate powering of the second thrust-generating device by the first thrust-generating device. Additionally or alternatively, such a configuration may permit and/or facilitate applying the input torque to the rotary electric machine with the first thrust-generating device.

As yet another example, the transitioning at 220 may include transitioning to the disengaged state when the turbine rotary shaft rotational frequency is less than the machine rotary shaft rotational frequency. Such a configuration may permit and/or facilitate powering of the second thrust-generating device, with the rotary electric machine, independent of the first thrust-generating device. Additionally or alternatively, such a configuration may permit application of the input torque by the second thrust-generating device, as discussed in more detail herein.

Selectively providing the electric power input at 230 may include selectively providing the electric power input to the rotary electric machine, with an electric power system, and generating, at 235, an output torque that rotates the machine rotary shaft and the second thrust-generating device. The output torque may be generated by the rotary electric machine responsive to receipt of the electric power input by the rotary electric machine.

Selectively receiving the input torque at 240 may include selectively receiving the input torque, from the second thrust-generating device, with the rotary electric machine, generating, at 245, an electric power output, and providing the electric power output to the electric power system. The electric power output may be generated, by the rotary electric machine, responsive to receipt of the input torque.

The hybrid turbine engine may be operatively attached to an aircraft, and accelerating the aircraft at 250 may include accelerating the aircraft with, via, and/or utilizing the hybrid turbine engine. The accelerating at 250 may be performed during takeoff and/or climb of the aircraft.

The accelerating at 250 may be performed while the clutch is in the engaged state, such as may be accomplished during the transitioning at 220, during the combusting at 210, and during the selectively providing at 230. Under these conditions, the second thrust-generating device 80 of the hybrid turbine engine may be powered by both the first thrust-generating device 30, such as via performing the combusting at 210 in a high thrust output state, and by the electric power system 100, such as via the providing at 230. Such a configuration may permit hybrid turbine engines, according to the present disclosure, to produce a greater amount of overall thrust and/or to have a smaller first thrust-generating device (e.g., turbine) when compared to turbine engines that perform the combusting at 210 but do not perform the transitioning at 220 and the selectively providing at 230.

Alternatively, the accelerating at 250 may be performed while the clutch is in the disengaged state, such as may be accomplished during the transitioning at 220, and during the selectively providing at 230. Under these conditions, the combusting at 210 may include combusting in a low fuel burn state, an idle state, and/or a low thrust output state, such as to decrease fuel consumption of the first thrust-generating device, and the accelerating at 250 may be accomplished, or powered, primarily, or even solely via the second thrust-generating device 80 by the electric power system 100.

Decelerating the aircraft at 260 may include decelerating that aircraft with, via, and/or utilizing the hybrid turbine engine. The decelerating at 260 may be performed, for example, during descent and/or landing of the aircraft. The decelerating at 260 may include decreasing a kinetic energy of the aircraft. The decelerating at 260 may be performed while the clutch is in the disengaged state, such as may be accomplished during the transitioning at 220. During the decelerating at 260, the combusting at 210 may include combusting in the low fuel burn state, the idle state, and/or the low thrust output state, such as to decrease fuel consumption of the first thrust-generating device 30.

During the decelerating at 260, air flow through the second thrust-generating device 80 may rotate the second thrust-generating device, thereby providing a motive force for the selectively receiving at 240. Stated another way, the selectively receiving at 240 may be performed during, or concurrently with, the decelerating at 260, such as to facilitate the generating at 245 and/or to charge, or recharge, the electric power system 100. Stated yet another way, and during the decelerating at 260, a portion of the kinetic energy of the aircraft, which is decreased during the decelerating at 260, may be converted, via the second thrust-generating device and the rotary electric machine, to electrical energy, which may be stored by the electric power system. This may increase an overall efficiency of the aircraft and/or of the hybrid turbine jet engine that powers the aircraft. Such a configuration may be referred to herein as windmill brake mode.

As another example of the decelerating at 260, the selectively providing at 230 may be utilized to generate a reverse-thrust with the second thrust-generating device 80. Such a reverse thrust may be generated by rotating the second thrust-generating device 80 in a reverse-thrust direction and/or by deploying a thrust reverser assembly of the hybrid turbine engine and rotating the second thrust-generating device 80 in a forward-thrust direction. The forward-thrust direction may be a rotational direction, such as one of clockwise and counterclockwise, that generates a forward thrust that urges the aircraft forward. In contrast, the reverse-thrust direction may be a rotational direction, such as the other of clockwise and counterclockwise, that generates a reverse thrust that urges the aircraft backward.

Descending the aircraft at 270 may include decreasing an altitude of the aircraft and/or decreasing a distance between the aircraft and a ground surface that is below the aircraft. The descending at 270 may include decreasing a potential energy, or a gravitational potential energy, of the aircraft, such as via the decrease between the aircraft and the ground surface. The descending at 260 may be performed while the clutch is in the disengaged state, such as may be accomplished during the transitioning at 220. During the descending at 270, the combusting at 210 may include combusting in the low fuel burn state, the idle state, and/or the low thrust output state, such as to decrease fuel consumption of the first thrust-generating device 30.

During the descending at 270, air flow through the second thrust-generating device 80 may rotate the second thrust-generating device, thereby providing a motive force for the selectively receiving at 240. Stated another way, the selectively receiving at 240 may be performed during, or concurrently with, the descending at 270, such as to facilitate the generating at 245 and/or to charge, or recharge, the electric power system 100. Stated yet another way, and during the descending at 270, a portion of the potential energy of the aircraft, which is decreased during the descending at 270, may be converted, via the second thrust-generating device and the rotary electric machine, to electrical energy, which may be stored by the electric power system. This may increase an overall efficiency of the aircraft and/or of the hybrid turbine jet engine that powers the aircraft. Such a configuration may be referred to herein as windmill power generation mode.

Cruising the aircraft at 280 may include cruising the aircraft at a constant, or at least substantially constant, velocity and/or altitude. Methods 200 may include performing the combusting at 210 while the clutch is in the engaged state and during the cruising at 280, such as to power both the second thrust-generating device 80 with the first thrust-generating device 30. Additionally or alternatively, methods 200 may include performing the selectively receiving at 240 during the cruising at 280, such as to provide the electric power output (as a result of the generating at 245) to the electric power system and/or to charge the electric power system. Stated another way, and during the cruising at 280, the first thrust-generating device 30 may be utilized to provide a motive force for the selectively receiving at 240.

Starting the aircraft at 290 may include starting the aircraft with, via, and/or utilizing the rotary electric machine 60. This may include performing the selectively receiving at 240 while the clutch is in the engaged state to rotate the turbine rotary shaft with the rotary electric machine 60 and/or to permit, facilitate, and/or initiate the combusting at 210.

Figure 10:
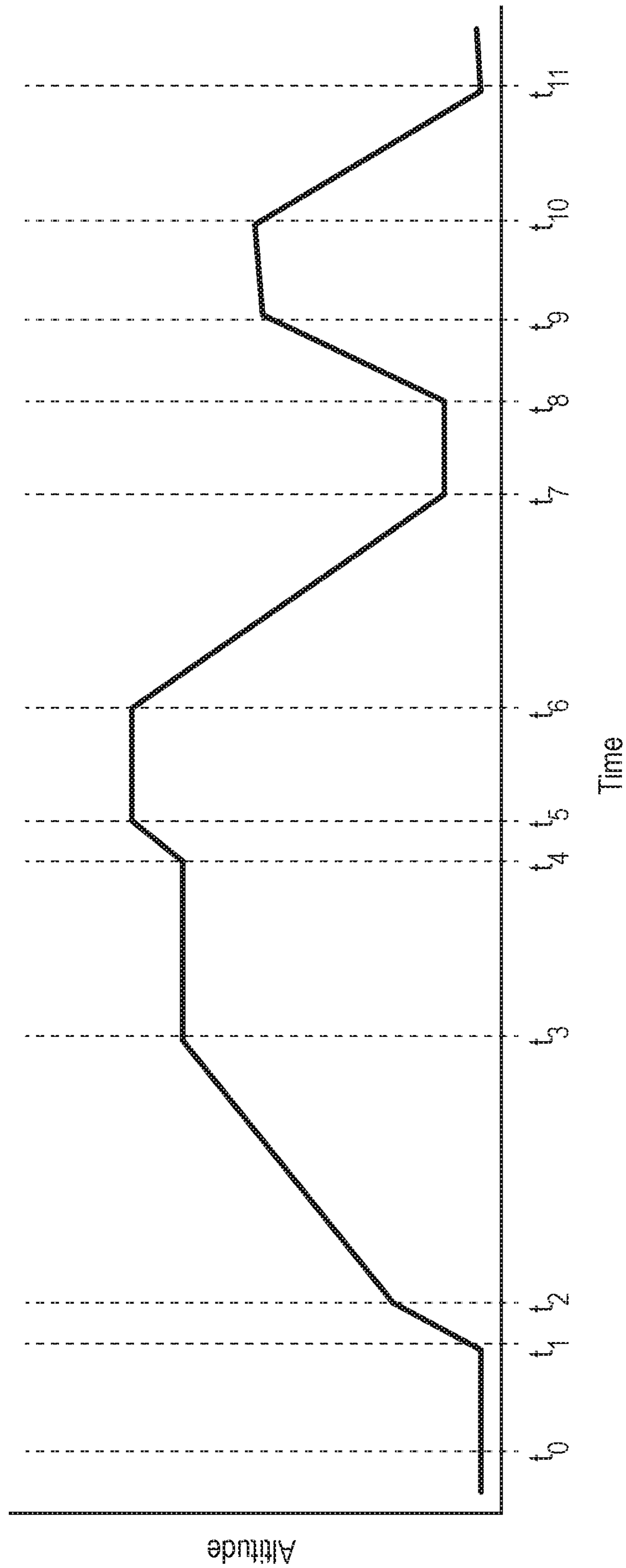
FIG. 10 is a chart illustrating examples of operational modes of a hybrid turbine engine, according to the present disclosure.

FIG. 10 is a chart illustrating examples of operational modes of a hybrid turbine engine, such as hybrid turbine engine 20 of FIGS. 1-8, and/or of an aircraft that includes the hybrid turbine engine. These operational modes are illustrated in the form of an altitude vs. time plot.

In the example of FIG. 10, an aircraft initially may be on the ground and/or may be in an idle state on the ground, such as for times that are less than time $t_0$. During at least a portion of this state, the hybrid turbine engine may be off, may not be running, and/or may not be consuming fuel. Subsequently, the hybrid turbine engine may be started, such as is described herein with reference to the starting at 290 of FIG. 9. Once the hybrid turbine engine is started, the hybrid turbine engine may be referred to herein as running and/or as being in a running state.

With the hybrid turbine engine running, the aircraft may initiate take-off, such as from time $t_0$ to time $t_1$ in FIG. 10. During take-off, the aircraft may be accelerated utilizing the hybrid turbine engine. This may include acceleration that is facilitated utilizing first thrust-generating device 30 and/or utilizing second thrust-generating device 80 of FIGS. 2-8.

As an example, second thrust-generating device 80 may be sized to provide sufficient thrust for take-off alone and/or without being supplemented by first thrust-generating device 30. Under these conditions, first thrust-generating device 30 may be in the idle state, and electric power system 100 may be utilized to provide electric power input 105 to rotary electric machine 60, such as is described herein with reference to the selectively providing at 230 of FIG. 9. Responsive to receipt of the electric power input, the rotary electric machine may produce and/or generate the output torque, which may power second thrust-generating device 80, as described herein with reference to the generating at 235 of FIG. 9. Second thrust-generating device 80 then may generate a thrust that is sufficient to accelerate the aircraft for take-off. In this example, clutch 50 may be in the disengaged state during take-off of the aircraft.

As another example, first thrust-generating device 30 and second thrust-generating device 80 together, or cooperatively, may be utilized to accelerate the aircraft for take-off. Under these conditions, clutch 50 may be in the engaged state and both the first thrust-generating device and the second thrust-generating device may be utilized to generate thrust, such as via simultaneously performing the combusting at 210, the providing at 230, and the generating at 235 of FIG. 9.

Upon reaching sufficient speed, the aircraft may begin to climb, as illustrated between times $t_1$ and $t_3$ in FIG. 10. During climb, first thrust-generating device 30 may be utilized alone, second thrust-generating device 80 may be utilized alone, and/or the first thrust-generating device and the second thrust-generating device may be utilized concurrently and/or cooperatively. As an example, and when the first thrust-generating device is sized for cruise efficiency, the first thrust-generating device and the second thrust-generating device may be utilized concurrently and/or cooperatively, and the clutch may be in the engaged state. As another example, and when the first thrust-generating device is sized to provide sufficient thrust for climb, the first thrust-generating device may be utilized alone, and the clutch may be in the disengaged state. As yet another example, and when the second thrust-generating device is sized to provide sufficient thrust for climb, the second thrust-generating device may be utilized alone, and the clutch may be in the disengaged state.

As another example, and as illustrated in FIG. 10, the first thrust-generating device and the second thrust-generating device may be utilized at least partially sequentially. Under these conditions, the first thrust-generating device and the second thrust-generating device initially may be utilized concurrently, with the clutch in the engaged state, to provide maximum thrust, as illustrated between times $t_1$ and $t_2$. Once a threshold speed and/or altitude is reached, the second thrust-generating device may be utilized alone, with the clutch in the disengaged sate, such as is illustrated between times $t_2$ and $t_3$. Such a configuration may provide the high acceleration that may be needed for take-off and initial climb while, at the same time, decreasing overall fuel consumption.

Once cruise altitude is reached, and as illustrated between times $t_3$ and $t_4$, first thrust-generating device 30 may be utilized alone to provide thrust sufficient to maintain the altitude and/or speed of the aircraft. During this time period, the clutch may be in the engaged state and the first thrust-generating device may provide the input torque to the second thrust-generating device and/or to the rotary electric machine, thereby facilitating generation of the output electric current by the rotary electric machine and permitting charging of the electric power system.

If an altitude increase is desired, and as illustrated in FIG. 10 between times $t_4$ and $t_5$, the second thrust-generating device may be utilized to provide additional thrust, such as to supplement the first thrust-generating device or in place of the first thrust-generating device. This may permit the altitude increase to be achieved while, at the same time, permitting the first thrust-generating device to remain in an efficient operating regime. Cruise operation them may be continued, as illustrated in FIG. 10 between times $t_5$ and $t_6$.

During descent of the aircraft, and as illustrated in FIG. 10 between times $t_6$ and $t_7$ and also between times $t_{10}$ and $t_{11}$, the clutch may be disengaged and the first thrust-generating device may be in the idle, or low fuel consumption, state. In addition, the second thrust-generating device may receive the input torque due to the decrease in speed and/or altitude, and the corresponding decrease in kinetic and/or potential energy, respectively, thereby permitting generation of the electric power output and facilitating charging, or recharging, of the electric power system.

If it becomes necessary to increase the speed and/or altitude of the aircraft, such as may be due to the aircraft being diverted and/or landing being delayed and as is illustrated between times $t_8$ and $t_9$ in FIG. 10, the hybrid turbine engine may be utilized increase the speed and/or altitude of the aircraft. This may be accomplished as described herein with reference to the climb between times $t_1$ and $t_3$.

Upon landing the aircraft, such as is illustrated for times greater than $t_{11}$ in FIG. 10, additional deceleration may be needed. This additional deceleration may be accomplished utilizing a conventional thrust reverse assembly, with the thrust being provided by the first thrust-generating device and/or by the second thrust-generating device. Alternatively, the hybrid turbine engine may not include a conventional thrust reverse assembly. Under these conditions, rotation of the second thrust-generating device may be reversed (i.e., the rotary electric machine may be driven in reverse) to generate the reverse thrust. Such a configuration may permit generation of reverse thrust without increasing, or even utilizing, thrust generated by the first thrust-generating device.

Illustrative, non-exclusive examples of inventive subject matter according to the present disclosure are described in the following enumerated paragraphs:

A1. A hybrid turbine engine, comprising:

a first thrust-generating device that includes a turbine, wherein the turbine includes a turbine rotary shaft;

a clutch including a clutch input, which is operatively coupled to the turbine rotary shaft, and a clutch output, wherein the clutch defines:

(i) an engaged state in which the clutch input is rotationally coupled to the clutch output; and (ii) a disengaged state in which the clutch input is rotationally decoupled from the clutch output;

a rotary electric machine including a machine rotary shaft, which is operatively coupled to the clutch output;

a second thrust-generating device that is operatively coupled to the machine rotary shaft; and an electric power system;

wherein the rotary electric machine is configured to:

(i) selectively receive an electric power input from the electric power system and generate an output torque to rotate the second thrust-generating device, via the machine rotary shaft, responsive to receipt of the electric power input; and (ii) selectively receive an input torque from the machine rotary shaft, to generate an electric power output responsive to receipt of the input torque, and to provide the electric power output to the electric power system.

A2. The hybrid turbine engine of paragraph A1, wherein the turbine rotary shaft is a low-speed turbine rotary shaft that rotates at a low-speed shaft rotational frequency, and further wherein the first thrust-generating device includes a high-speed turbine rotary shaft that rotates at a high-speed shaft rotational frequency that is greater than the low-speed shaft rotational frequency.

A3. The hybrid turbine engine of paragraph A2, wherein the first thrust-generating device further includes at least one of:

(i) a combustion chamber;

(ii) a compressor, or a low-pressure compressor, that optionally is upstream from the combustion chamber, optionally is operatively coupled to the turbine rotary shaft, or to the low-speed turbine rotary shaft, and optionally is configured to rotate with the turbine rotary shaft, or with the low-speed turbine rotary shaft;

(iii) a turbine, or a low-pressure turbine, that optionally is downstream from the combustion chamber, optionally is operatively coupled to the turbine rotary shaft, or to the low-speed turbine rotary shaft, and optionally is configured to rotate with the turbine rotary shaft, or with the low-speed turbine rotary shaft;

(iv) a high-pressure compressor that optionally is downstream from the low-pressure compressor, optionally is upstream from the combustion chamber, optionally is operatively coupled to the high-speed turbine rotary shaft, and optionally is configured to rotate with the high-speed turbine rotary shaft;

(v) a high-pressure turbine that optionally is upstream from the low-pressure turbine, optionally is downstream from the combustion chamber, optionally is operatively coupled to the high-speed turbine rotary shaft, and optionally is configured to rotate with the high-speed turbine rotary shaft.

A4. The hybrid turbine engine of any of paragraphs A1-A3, wherein the second thrust-generating device includes at least one of:

(i) a fan; and (ii) a propeller.

A5. The hybrid turbine engine of any of paragraphs A1-A4, wherein the clutch includes at least one of an overrunning clutch, a one-way clutch, a one-way tapered clutch, a tooth clutch, and a synchronized clutch.

A6. The hybrid turbine engine of any of paragraphs A1-A5, wherein the clutch includes a synchronization structure configured to synchronize the clutch input and the clutch output prior to permitting the clutch to transition from the disengaged state to the engaged state.

A7. The hybrid turbine engine of paragraph A6, wherein the synchronization structure includes a speed controller configured to control a rotational frequency of the rotary electric machine to synchronize the clutch output to the clutch input.

A8. The hybrid turbine engine of wherein the clutch includes an automatically actuated clutch.

A9. The hybrid turbine engine of paragraph A8, wherein the automatically actuated clutch is configured to automatically rotationally couple the clutch input to the clutch output when a clutch input rotational frequency is greater than a clutch output rotational frequency.

A10. The hybrid turbine engine of any of paragraphs A8-A9, wherein the automatically actuated clutch is configured to automatically rotationally decouple the clutch input from the clutch output when a/the clutch input rotational frequency is less than a/the clutch output rotational frequency.

A11. The hybrid turbine engine of any of paragraphs A1-A10, wherein the clutch includes a selectively actuated clutch.

A12. The hybrid turbine engine of paragraph A11, wherein the selectively actuated clutch includes an engagement structure configured to selectively transition the clutch between the engaged state and the disengaged state.

A13. The hybrid turbine engine of paragraph A12, wherein the engagement structure includes at least one of an electrically actuated engagement structure and a hydraulically actuated engagement structure.

A14. The hybrid turbine engine of any of paragraphs A1-A13, wherein the rotary electric machine includes a rotor that is operatively attached to, and rotates with, at least one of:

(i) the machine rotary shaft; and (ii) the second thrust-generating device.

A15. The hybrid turbine engine of any of paragraphs A1-A14, wherein the rotary electric machine includes a stator that is operatively attached to an engine case structure of the hybrid turbine engine.

A16. The hybrid turbine engine of any of paragraphs A1-A15, wherein the machine rotary shaft is at least one of:

(i) axially aligned with the turbine rotary shaft; and (ii) axially offset from the turbine rotary shaft.

A17. The hybrid turbine engine of any of paragraphs A1-A16, wherein the machine rotary shaft is parallel to the turbine rotary shaft.

A18. The hybrid turbine engine of any of paragraphs A1-A17, wherein the rotary electric machine includes a permanent magnet brushless AC asynchronous axial electric machine.

A19. The hybrid turbine engine of any of paragraphs A1-A18, wherein the second thrust-generating device includes a central hub, and further wherein at least a portion of the rotary electric machine is internal to the central hub.

A20. The hybrid turbine engine of paragraph A19, wherein a/the stator of the rotary electric machine includes a field coil that is operatively attached to an/the engine case structure of the hybrid turbine engine and is internal to the central hub.

A21. The hybrid turbine engine of paragraph A20, wherein the stator includes a central opening, and further wherein the machine rotary shaft extends through the central opening.

A22. The hybrid turbine engine of any of paragraphs A20-A21, wherein the hybrid turbine engine includes a forward bearing that supports the machine rotary shaft on a front side of the stator.

A23. The hybrid turbine engine of any of paragraphs A20-A22, wherein the hybrid turbine engine includes an aft bearing that supports the central hub.

A24. The hybrid turbine engine of any of paragraphs A19-A23, wherein a/the rotor of the rotary electric machine includes a plurality of magnets operatively attached to the central hub.

A25. The hybrid turbine engine of paragraph A24, wherein the plurality of magnets is positioned between a/the stator of the rotary electric machine and the central hub.

A26. The hybrid turbine engine of any of paragraphs A24-A25, wherein the plurality of magnets is internal to the central hub.

A27. The hybrid turbine engine of any of paragraphs A19-A26, wherein the second thrust-generating device includes a plurality of fan blades that extends from the central hub.

A28. The hybrid turbine engine of any of paragraphs A19-A27, wherein the second thrust-generating device includes a/the propeller including a plurality of propeller blades that extends from the central hub.

A29. The hybrid turbine engine of any of paragraphs A27-A28, wherein the hybrid turbine engine includes a pitch control device configured to adjust a pitch of the plurality of fan blades and/or of the plurality of propeller blades.

A30. The hybrid turbine engine of any of paragraphs A28-A29, wherein the pitch control device is operatively attached to the central hub.

A31. The hybrid turbine engine of any of paragraphs A1-A30, wherein the rotary electric machine is a ring-drive rotary electric machine.

A32. The hybrid turbine engine of any of paragraphs A1-A31, wherein the hybrid turbine engine includes an/the engine case structure, which surrounds the second thrust-generating device.

A33. The hybrid turbine engine of paragraph A32, wherein a/the stator of the rotary electric machine is operatively attached to the engine case structure.

A34. The hybrid turbine engine of paragraph A32, wherein the stator includes a/the field coil.

A35. The hybrid turbine engine of any of paragraphs A1-A34, wherein the second thrust-generating device defines an outer periphery region, and further wherein a/the rotor of the rotary electric machine is operatively attached to the outer periphery region.

A36. The hybrid turbine engine of any of paragraphs A1-A35, wherein the second thrust-generating device includes at least one of:

(i) a/the fan including a/the plurality of fan blades extending radially from the machine rotary shaft; and (ii) a/the propeller including a/the plurality of propeller blades extending radially from the machine rotary shaft.

A37. The hybrid turbine engine of paragraph A36, wherein a/the rotor of the rotary electric machine is operatively attached to an/the outer periphery region of the plurality of fan blades.

A38. The hybrid turbine engine of any of paragraphs A36-A37, wherein the second thrust-generating device further includes a stabilization ring that operatively interconnects a tip region of each fan blade in the plurality of fan blades.

A39. The hybrid turbine engine of any of paragraphs A1-A38, wherein at least one of:

(i) the clutch input is directly operatively coupled to the turbine rotary shaft; and (ii) the clutch output is directly operatively coupled to the machine rotary shaft.

A40. The hybrid turbine engine of any of paragraphs A1-A39, wherein the hybrid turbine engine further includes a gear box.

A41. The hybrid turbine engine of paragraph A40, wherein the gear box is positioned between the first thrust-generating device and the second thrust-generating device.

A42. The hybrid turbine engine of any of paragraphs A40-A41, wherein the gear box is configured to provide a predetermined rotational frequency ratio between the turbine rotary shaft and the machine rotary shaft when the clutch is in the engaged state.

A43. The hybrid turbine engine of any of paragraphs A40-A42, wherein the gear box includes a gear box input, which is operatively coupled, or directly operatively coupled, to the turbine rotary shaft, and an output stub shaft, which is operatively coupled, or directly operatively coupled, to the clutch input.

A44. The hybrid turbine engine of any of paragraphs A40-A43, wherein the clutch input is operatively coupled to the turbine rotary shaft via the gear box.

A45. The hybrid turbine engine of any of paragraphs A40-A44, wherein the gear box includes an input stub shaft, which is operatively coupled, or directly operatively coupled, to the clutch output, and a gear box output, which is operatively coupled, or directly operatively coupled, to the machine rotary shaft.

A46. The hybrid turbine engine of any of paragraphs A40-A45, wherein the clutch output is operatively coupled to the machine rotary shaft via the gear box.

A47. The hybrid turbine engine of any of paragraphs A1-A46, wherein the electric power system includes an energy storage device configured to:

(i) provide the electric power input to the rotary electric machine; and (ii) receive the electric power output from the rotary electric machine.

A48. The hybrid turbine engine of paragraph A47, wherein the energy storage device includes a battery.

A49. The hybrid turbine engine of any of paragraphs A47-A48, wherein the electric power system includes a power supply conduit configured to:

(i) convey the electric power input from the energy storage device to the rotary electric machine, or to a/the stator of the rotary electric machine; and (ii) receive the electric power output from rotary electric machine, or from the stator.

A50. The hybrid turbine engine of any of paragraphs A47-A49, wherein the electric power system includes a power conditioner configured to:

(i) receive an unconditioned electric power input from the energy storage device, condition the unconditioned electric power input to produce a conditioned electric power input, and provide the conditioned electric power input to the rotary electric machine; and (ii) receive an unconditioned electric power output from the rotary electric machine, condition the unconditioned electric power output to produce a conditioned electric power output, and provide the conditioned electric power output to the energy storage device.

A51. The hybrid turbine engine of paragraph A50, wherein the power conditioner includes at least one of:

(i) an electronic speed controller;

(ii) an AC/DC converter; and (iii) a DC/AC inverter.

A52. The hybrid turbine engine of any of paragraphs A50-A51, wherein at least one of:

(i) the unconditioned electric power input includes, or is, a DC unconditioned electric power input;

(ii) the conditioned electric power input includes, or is, an AC conditioned electric power input;

(iii) the unconditioned electric power output includes, or is, an AC unconditioned electric power output; and (iv) the conditioned electric power output includes, or is, a DC conditioned electric power output.

A53. An aircraft including the hybrid jet engine of any of paragraphs A1-A52.

B1. A method of operating a hybrid turbine engine, the method comprising:

combusting a fuel within a turbine of a first thrust-generating device to rotate a turbine rotary shaft of the first thrust-generating device at a turbine rotary shaft rotational frequency, wherein the turbine rotary shaft is operatively coupled to a clutch input of a clutch, wherein the clutch includes a clutch output, which is operatively coupled to a machine rotary shaft of a rotary electric machine, wherein the machine rotary shaft rotates at a machine rotary shaft rotational frequency, and further wherein a second thrust-generating device is operatively coupled to the machine rotary shaft;

selectively providing an electric power input to the rotary electric machine with an electric power system, wherein, responsive to receipt of the electric power input by the rotary electric machine, the method further includes generating an output torque that rotates the machine rotary shaft and the second thrust-generating device; and selectively receiving an input torque from the second thrust-generating device with the rotary electric machine, wherein, responsive to receipt of the input torque by the rotary electric machine, the method further includes generating an electric power output with the rotary electric machine and providing the electric power output to the electric power system.

B2. The method of paragraph B1, wherein the clutch defines:

(i) an engaged state in which the clutch input is rotationally coupled to the clutch output; and (ii) a disengaged state in which the clutch input is rotationally decoupled from the clutch output.

B3. The method of paragraph B2, wherein the method includes transitioning the clutch to the engaged state when the turbine rotary shaft rotational frequency is at least as great as the machine rotary shaft rotational frequency.

B4. The method of any of paragraphs B2-B3, wherein the method includes transitioning the clutch to the disengaged state when the turbine rotary shaft rotational frequency is less than the machine rotary shaft rotational frequency.

B5. The method of any of paragraphs B1-B4, wherein the hybrid turbine engine is operatively attached to an aircraft.

B6. The method of paragraph B5, wherein the method includes accelerating the aircraft.

B7. The method of paragraph B6, wherein, during the accelerating, the method includes performing the selectively providing the electric power input to the rotary electric machine while the clutch is in an/the engaged state to power the second thrust-generating device with both the first thrust-generating device and the rotary electric machine.

B8. The method of any of paragraphs B6-B7, wherein the accelerating includes accelerating during at least one of takeoff and climb of the aircraft.

B9. The method of any of paragraphs B6-B8, wherein, during the accelerating, the method includes performing the selectively providing while the clutch is in a/the disengaged state.

B10. The method of any of paragraphs B5-B9, wherein the method includes at least one of:

(i) decelerating the aircraft, and further wherein, during the decelerating, the method includes performing the selectively receiving while the clutch is in a/the disengaged state; and (ii) descending the aircraft, and further wherein, during the descending, the method includes performing the selectively receiving while the clutch is in a/the disengaged state.

B11. The method of any of paragraphs B5-B10, wherein the method includes decelerating the aircraft, and further wherein, during the decelerating, the method includes performing the selectively providing to generate reverse-thrust with the second thrust-generating device while the clutch is in the disengaged state.

B12. The method of paragraph B11, wherein at least one of:

(i) the reverse-thrust is generated by rotating the second thrust-generation device in a reverse-thrust direction; and (ii) the reverse-thrust is generated by deploying a thrust-reverser assembly and rotating the second thrust-generating device in a forward thrust direction.

B13. The method of any of paragraphs B11-B12, wherein the decelerating includes decelerating during at least one of descent and landing of the aircraft.

B14. The method of any of paragraphs B5-B13, wherein the method includes cruising the aircraft at a constant, or at least substantially constant, velocity, and further wherein, during the cruising, the method includes performing the selectively receiving while the clutch is in the engaged state to charge the electric power system.

B15. The method of any of paragraphs B1-B14, wherein the method includes performing the selectively providing while the clutch is in an/the engaged state to rotate the turbine rotary shaft with the rotary electric machine and initiate the combusting.

B16. The method of any of paragraphs B1-B15 performed utilizing the hybrid turbine engine of any of paragraphs A1-A52 or the aircraft of paragraph A53.

As used herein, the terms "selective" and "selectively," when modifying an action, movement, configuration, or other activity of one or more components or characteristics of an apparatus, mean that the specific action, movement, configuration, or other activity is a direct or indirect result of user manipulation of an aspect of, or one or more components of, the apparatus.

As used herein, the terms "adapted" and "configured" mean that the element, component, or other subject matter is designed and/or intended to perform a given function. Thus, the use of the terms "adapted" and "configured" should not be construed to mean that a given element, component, or other subject matter is simply "capable of" performing a given function but that the element, component, and/or other subject matter is specifically selected, created, implemented, utilized, programmed, and/or designed for the purpose of performing the function. It is also within the scope of the present disclosure that elements, components, and/or other recited subject matter that is recited as being adapted to perform a particular function may additionally or alternatively be described as being configured to perform that function, and vice versa. Similarly, subject matter that is recited as being configured to perform a particular function may additionally or alternatively be described as being operative to perform that function.

As used herein, the phrase "at least one," in reference to a list of one or more entities should be understood to mean at least one entity selected from any one or more of the entity in the list of entities, but not necessarily including at least one of each and every entity specifically listed within the list of entities and not excluding any combinations of entities in the list of entities. This definition also allows that entities may optionally be present other than the entities specifically identified within the list of entities to which the phrase "at least one" refers, whether related or unrelated to those entities specifically identified. Thus, as a non-limiting example, "at least one of A and B" (or, equivalently, "at least one of A or B," or, equivalently "at least one of A and/or B") may refer, in one embodiment, to at least one, optionally including more than one, A, with no B present (and optionally including entities other than B); in another embodiment, to at least one, optionally including more than one, B, with no A present (and optionally including entities other than A); in yet another embodiment, to at least one, optionally including more than one, A, and at least one, optionally including more than one, B (and optionally including other entities). In other words, the phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" may mean A alone, B alone, C alone, A and B together, A and C together, B and C together, A, B and C together, and optionally any of the above in combination with at least one other entity.

The various disclosed elements of apparatuses and steps of methods disclosed herein are not required to all apparatuses and methods according to the present disclosure, and the present disclosure includes all novel and non-obvious combinations and subcombinations of the various elements and steps disclosed herein. Moreover, one or more of the various elements and steps disclosed herein may define independent inventive subject matter that is separate and apart from the whole of a disclosed apparatus or method. Accordingly, such inventive subject matter is not required to be associated with the specific apparatuses and methods that are expressly disclosed herein, and such inventive subject matter may find utility in apparatuses and/or methods that are not expressly disclosed herein.

As used herein, the phrase, "for example," the phrase, "as an example," and/or simply the term "example," when used with reference to one or more components, features, details, structures, embodiments, and/or methods according to the present disclosure, are intended to convey that the described component, feature, detail, structure, embodiment, and/or method is an illustrative, non-exclusive example of components, features, details, structures, embodiments, and/or methods according to the present disclosure. Thus, the described component, feature, detail, structure, embodiment, and/or method is not intended to be limiting, required, or exclusive/exhaustive; and other components, features, details, structures, embodiments, and/or methods, including structurally and/or functionally similar and/or equivalent components, features, details, structures, embodiments, and/or methods, are also within the scope of the present disclosure.

The invention claimed is:

1. A hybrid turbine engine, comprising:

a first thrust-generating device that includes a turbine, wherein the turbine includes a turbine rotary shaft;

a clutch including a clutch input, operatively coupled to the turbine rotary shaft, and a clutch output, wherein the clutch defines:

(i) an engaged state in which the clutch input is rotationally coupled to the clutch output; and (ii) a disengaged state in which the clutch input is rotationally decoupled from the clutch output;

a rotary electric machine including a machine rotary shaft, operatively coupled to the clutch output;

a second thrust-generating device that is operatively coupled to the machine rotary shaft; and an electric power system;

wherein the rotary electric machine is configured to:

(i) selectively receive an electric power input from the electric power system and generate an output torque to rotate the second thrust-generating device, via the machine rotary shaft, responsive to receipt of the electric power input; and (ii) selectively receive an input torque from the second thrust-generating device, to generate an electric power output responsive to receipt of the input torque, and to provide the electric power output to the electric power system.

2. The hybrid turbine engine of claim 1, wherein the clutch includes a synchronization structure configured to synchronize the clutch input and the clutch output prior to permitting the clutch to transition from the disengaged state to the engaged state, wherein the synchronization structure includes a speed controller configured to control a rotational frequency of the rotary electric machine to synchronize the clutch output to the clutch input.

3. The hybrid turbine engine of claim 1, wherein the clutch includes an automatically actuated clutch, wherein the automatically actuated clutch is configured to:

(i) automatically rotationally couple the clutch input to the clutch output when a clutch input rotational frequency is greater than a clutch output rotational frequency; and (ii) automatically rotationally decouple the clutch input from the clutch output when the clutch input rotational frequency is less than the clutch output rotational frequency.

4. The hybrid turbine engine of claim 1, wherein the second thrust-generating device includes a central hub, and further wherein at least a portion of the rotary electric machine is internal to the central hub.

5. The hybrid turbine engine of claim 4, wherein the second thrust-generating device includes at least one of:

(i) a fan including a plurality of fan blades that extends from the central hub; and (ii) a propeller including a plurality of propeller blades that extends from the central hub.

6. The hybrid turbine engine of claim 1, wherein the rotary electric machine is a ring-drive rotary electric machine, wherein the hybrid turbine engine includes an engine case structure, which surrounds the second thrust-generating device, and further wherein a stator of the rotary electric machine is operatively attached to the engine case structure.

7. The hybrid turbine engine of claim 6, wherein the second thrust-generating device defines an outer periphery region, and further wherein a rotor of the rotary electric machine is operatively attached to the outer periphery region.

8. The hybrid turbine engine of claim 1, wherein the hybrid turbine engine further includes a gear box, wherein the gear box is positioned between the first thrust-generating device and the second thrust-generating device, and further wherein the gear box is configured to provide a predetermined rotational frequency ratio between the turbine rotary shaft and the machine rotary shaft when the clutch is in the engaged state.

9. The hybrid turbine engine of claim 1, wherein the clutch includes a selectively actuated clutch, wherein the selectively actuated clutch includes an engagement structure configured to selectively transition the clutch between the engaged state and the disengaged state.

10. The hybrid turbine engine of claim 9, wherein the engagement structure includes at least one of:

(i) an electrically actuated engagement structure; and (ii) a hydraulically actuated engagement structure.

11. The hybrid turbine engine of claim 9, wherein the engagement structure is configured to be selectively actuated between the engaged state and the disengaged state by at least one of:

(i) an operator of the hybrid turbine engine; and (ii) a control system of the hybrid turbine engine.

12. A method of operating a hybrid turbine engine, the method comprising:

combusting a fuel within a turbine of a first thrust-generating device to rotate a turbine rotary shaft of the first thrust-generating device at a turbine rotary shaft rotational frequency, wherein the turbine rotary shaft is operatively coupled to a clutch input of a clutch, wherein the clutch includes a clutch output operatively coupled to a machine rotary shaft of a rotary electric machine, wherein the machine rotary shaft rotates at a machine rotary shaft rotational frequency, and further wherein a second thrust-generating device is operatively coupled to the machine rotary shaft;

selectively providing an electric power input to the rotary electric machine with an electric power system, wherein, responsive to receipt of the electric power input by the rotary electric machine, the method further includes generating an output torque that rotates the machine rotary shaft and the second thrust-generating device; and selectively receiving an input torque from the second thrust-generating device with the rotary electric machine, wherein, responsive to receipt of the input torque by the rotary electric machine, the method further includes generating an electric power output with the rotary electric machine and providing the electric power output to the electric power system.

13. The method of claim 12, wherein the clutch defines:

(i) an engaged state in which the clutch input is rotationally coupled to the clutch output; and (ii) a disengaged state in which the clutch input is rotationally decoupled from the clutch output;

wherein the method includes:

(i) transitioning the clutch to the engaged state when the turbine rotary shaft rotational frequency is greater than the machine rotary shaft rotational frequency; and (ii) transitioning the clutch to the disengaged state when the turbine rotary shaft rotational frequency is less than the machine rotary shaft rotational frequency.

14. The method of claim 12, wherein the hybrid turbine engine is operatively attached to an aircraft, wherein the method includes accelerating the aircraft, and further wherein, during the accelerating, the method includes performing the selectively providing while the clutch is in an engaged state to power the second thrust-generating device with both the first thrust-generating device and the rotary electric machine.

15. The method of claim 12, wherein the hybrid turbine engine is operatively attached to an aircraft, wherein the method includes accelerating the aircraft, and further wherein, during the accelerating, the method includes performing the selectively providing the electric power input to the rotary electric machine while the clutch is in a disengaged state.

16. The method of claim 12, wherein the hybrid turbine engine is operatively attached to an aircraft, wherein the method includes at least one of:

(i) decelerating the aircraft, and further wherein, during the decelerating, the method includes performing the selectively receiving while the clutch is in a disengaged state; and (ii) descending the aircraft, and further wherein, during the descending, the method includes performing the selectively receiving while the clutch is in the disengaged state.

17. The method of claim 12, wherein the hybrid turbine engine is operatively attached to an aircraft, wherein the method includes decelerating the aircraft, and further wherein, during the decelerating, the method includes performing the selectively providing to generate reverse-thrust with the second thrust-generating device while the clutch is in a disengaged state, wherein at least one of:

(i) the reverse-thrust is generated by rotating the second thrust-generation device in a reverse-thrust direction; and (ii) the reverse-thrust is generated by deploying a thrust-reverser assembly and rotating the second thrust-generating device in a forward-thrust direction.

18. The method of claim 12, wherein the hybrid turbine engine is operatively attached to an aircraft, wherein the method includes cruising the aircraft at an at least substantially constant velocity, and further wherein, during the cruising, the method includes performing the selectively receiving while the clutch is in an engaged state to charge the electric power system.

19. The method of claim 12, wherein the hybrid turbine engine is operatively attached to an aircraft, wherein the method includes performing the selectively providing while the clutch is in an engaged state to rotate the turbine rotary shaft with the rotary electric machine and initiate the combusting.

20. The method of claim 12, wherein the method further includes transitioning the clutch from a disengaged state to an engaged state, wherein the clutch includes a synchronization structure that includes a speed controller, and further wherein the transitioning includes controlling a rotational frequency of the rotary electric machine with the speed controller to synchronize the clutch output to the clutch input during the transitioning.

21. The method of claim 12, wherein the hybrid turbine engine is operatively attached to an aircraft, wherein the method includes:

(i) accelerating the aircraft, wherein, during the accelerating, the method includes performing the selectively providing to generate forward-thrust with the second thrust-generating device while the clutch is in a disengaged state by rotating the second thrust-generating device in a forward-thrust direction; and (ii) decelerating the aircraft, wherein, during the decelerating, the method includes performing the selectively providing to generate reverse-thrust with the second thrust-generating device while the clutch is in the disengaged state by rotating the second thrust-generation device in a reverse-thrust direction that is opposed to the forward-thrust direction.

* * * * *